United States Patent
Wang et al.

(10) Patent No.: US 12,217,033 B2
(45) Date of Patent: *Feb. 4, 2025

(54) SYSTEMS AND METHODS FOR CODE UNDERSTANDING AND GENERATION

(71) Applicant: Salesforce, Inc., San Francisco, CA (US)

(72) Inventors: Yue Wang, Singapore (SG); Weishi Wang, Singapore (SG); Shafiq Rayhan Joty, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,103

(22) Filed: Sep. 26, 2023

(65) Prior Publication Data

US 2024/0020102 A1 Jan. 18, 2024

Related U.S. Application Data

(63) Continuation of application No. 17/459,968, filed on Aug. 27, 2021, now Pat. No. 11,782,686.

(60) Provisional application No. 63/189,857, filed on May 18, 2021.

(51) Int. Cl.
| | |
|---|---|
| *G06F 9/44* | (2018.01) |
| *G06F 8/41* | (2018.01) |
| *G06F 18/214* | (2023.01) |
| *G06F 40/20* | (2020.01) |
| *G06N 3/047* | (2023.01) |
| *G06N 3/084* | (2023.01) |

(52) U.S. Cl.
CPC ............ *G06F 8/427* (2013.01); *G06F 18/214* (2023.01); *G06F 40/20* (2020.01); *G06N 3/047* (2023.01); *G06N 3/084* (2013.01)

(58) Field of Classification Search
None
See application file for complete search history.

(56) References Cited

U.S. PATENT DOCUMENTS

| | | |
|---|---|---|
| 11,169,786 B2 | 11/2021 | Badlani et al. |
| 2020/0117446 A1 | 4/2020 | Smith et al. |
| 2021/0191696 A1* | 6/2021 | Ibarra Von Borstel ... G06F 8/36 |
| 2021/0208855 A1 | 7/2021 | Zhang et al. |
| 2021/0357187 A1* | 11/2021 | Clement ................... G06F 8/36 |
| 2021/0357762 A1 | 11/2021 | Clement et al. |
| 2022/0066914 A1* | 3/2022 | Drain ........................ G06F 8/33 |
| 2022/0138240 A1 | 5/2022 | Bahrami et al. |

* cited by examiner

*Primary Examiner* — Insun Kang
(74) *Attorney, Agent, or Firm* — Haynes and Boone, LLP

(57) ABSTRACT

Embodiments described herein a code generation and understanding model that builds on a Transformer-based encoder-decoder framework. The code generation and understanding model is configured to derive generic representations for programming language (PL) and natural language (NL) in code domain via pre-training on unlabeled code corpus, and then to benefit many code-related downstream tasks with fine-tuning. Apart from the denoising sequence-to-sequence objectives widely adopted for pre-training on natural language, identifier tagging and prediction pre-training objective is adopted to enable the model to better leverage the crucial token type information from PL, which specifically are the identifiers assigned by developers.

18 Claims, 10 Drawing Sheets

|  | PLs | W/ NL | W/o NL | Identifier |
|---|---|---|---|---|
| CodeSearchNet | Ruby | 49,009 | 110,551 | 32.08% |
|  | JavaScript | 125,166 | 1,717,933 | 19.82% |
|  | Go | 319,132 | 379,103 | 19.32% |
|  | Python | 453,772 | 657,030 | 30.02% |
|  | Java | 457,381 | 1,070,271 | 25.76% |
|  | PHP | 525,357 | 398,058 | 23.44% |
| Our | C | 1M | - | 24.94% |
|  | CSharp | 228,496 | 856,375 | 27.85% |
|  | Total | 3,158,313 | 5,189,321 | 8,347,634 |

Table 1: Dataset statistics. "Identifier" denotes the proportion of identifiers over all code tokens for each PL.

FIG. 7

| Methods | Ruby | JavaScript | Go | Python | Java | PHP | Overall |
|---|---|---|---|---|---|---|---|
| RoBERTa | 11.17 | 11.90 | 17.72 | 18.14 | 16.47 | 24.02 | 16.57 |
| CodeBERT | 12.16 | 14.90 | 18.07 | 19.06 | 17.65 | 25.16 | 17.83 |
| DOBF | - | - | - | 18.24 | 19.05 | - | - |
| PLBART | 14.11 | 15.56 | 18.91 | 19.30 | 18.45 | 23.58 | 18.32 |
| CodeT5-small | 14.39 | 14.62 | 18.75 | 19.39 | 19.14 | 24.82 | 18.52 |
| +dual-gen | 15.25 | 15.49 | 19.24 | 19.79 | 19.68 | 25.63 | 19.18 |
| +multi-task | 15.47 | 15.40 | 19.36 | 19.76 | 19.46 | 25.53 | 19.16 |
| CodeT5-base | 15.21 | 15.45 | 19.63 | 19.92 | 20.08 | 25.56 | 19.31 |
| +dual-gen | 15.18 | 15.77 | 19.12 | 19.56 | 19.95 | 26.37 | 19.32 |
| +multi-task | 15.35 | 15.95 | 19.76 | 20.35 | 20.30 | 25.83 | 19.59 |

Table 2: Smoothed BLEU-4 scores on the code summarization task. The "Overall" column shows the average scores over six PLs. Best results are in bold.

FIG. 8

| Methods | EM | BLEU | CodeBLEU |
|---|---|---|---|
| GPT-2 | 17.35 | 25.37 | 29.69 |
| CodeGPT-2 | 18.25 | 28.69 | 32.71 |
| CodeGPT-adapted | 20.10 | 32.79 | 35.98 |
| PLBART | 18.75 | 36.69 | 38.52 |
| CodeT5-small | 20.35 | 34.19 | 37.40 |
| +dual-gen | 19.85 | 36.50 | 39.57 |
| +multi-task | 20.95 | 32.78 | 36.09 |
| CodeT5-base | 20.95 | 38.29 | 40.84 |
| +dual-gen | 21.00 | 38.62 | 41.23 |
| +multi-task | 21.15 | 37.54 | 40.01 |

Table 3: Results on the code generation task. EM denotes the exact match.

FIG. 9

| Methods | Java to C# | | C# to Java | | Refine Small | | Refine Medium | |
|---|---|---|---|---|---|---|---|---|
| | BLEU | EM | BLEU | EM | BLEU | EM | BLEU | EM |
| Naive Copy | 18.54 | 0 | 18.69 | 0 | 78.06 | 0 | 90.91 | 0 |
| RoBERTa (code) | 77.46 | 56.10 | 71.99 | 57.90 | 77.30 | 15.90 | 90.07 | 4.10 |
| CodeBERT | 79.92 | 59.00 | 72.14 | 58.80 | 77.42 | 16.40 | 91.07 | 5.20 |
| GraphCodeBERT | 80.58 | 59.40 | 72.64 | 58.80 | 80.02 | 17.30 | 91.31 | 9.10 |
| PLBART | 83.02 | 64.60 | 78.35 | 65.00 | 77.02 | 19.21 | 88.50 | 8.98 |
| CodeT5-small | 83.09 | 63.50 | 78.47 | 64.10 | 76.23 | 19.06 | 89.20 | 10.92 |
| +dual-gen | 82.24 | 63.20 | 78.10 | 63.40 | 77.03 | 17.50 | 88.99 | 10.28 |
| +multi-task | 83.49 | 64.30 | 78.56 | 65.40 | 77.03 | 20.94 | 87.51 | 11.11 |
| CodeT5-base | 83.85 | 65.00 | 79.51 | 65.70 | 76.34 | 20.53 | 89.26 | 12.33 |
| +dual-gen | 81.84 | 62.00 | 77.83 | 63.20 | 78.54 | 17.64 | 89.40 | 11.70 |
| +multi-task | 82.31 | 63.40 | 78.01 | 64.00 | 76.00 | 21.34 | 87.64 | 13.96 |

Table 4: BLEU scores and exact match (EM) accuracies for code translation and code refinement tasks.

FIG. 10

| Methods | Defect Accuracy | Clone F1 |
|---|---|---|
| RoBERTa | 61.05 | 94.9 |
| CodeBERT | 62.08 | 96.5 |
| DOBF | - | 96.5 |
| GraphCodeBERT | - | 97.1 |
| PLBART | 63.18 | 97.2 |
| CodeT5-small | 63.40 | 97.1 |
| +dual-gen | 63.47 | 97.0 |
| +multi-task | 63.58 | - |
| CodeT5-base | 64.71 | 97.2 |
| +dual-gen | 62.77 | 97.0 |
| +multi-task | 62.88 | - |

Table 5: Results on the code defect detection and clone detection tasks.

FIG. 11

| Type | Code |
|---|---|
| Target | ```public long ramBytesUsed(){
    return BASE_RAM_BYTES_USED+((index!=null)?
        index.ramBytesUsed() : 0);}``` |
| CodeT5 | ```public long ramBytesUsed(){
    long sizeInBytes = BASE_RAM_BYTES_USED;
    if (index != null){
        sizeInBytes += index.ramBytesUsed();}
    return sizeInBytes;}``` |

FIG. 12

| Methods | Sum-PY (BLEU-4) | Code-Gen (CodeBLEU) | Refine Small (EM) | Defect (Acc) |
|---|---|---|---|---|
| CodeT5 | 19.39 | 37.40 | 19.06 | 63.40 |
| -MSP | 18.63 | 34.37 | 15.92 | 64.02 |
| -IT | 19.03 | 36.18 | 18.65 | 63.29 |
| -MIP | 19.11 | 35.28 | 18.32 | 62.92 |

Table 6: Ablation study on four downstream tasks. "Sum-PY" denotes code summarization task on Python and "Code-Gen" denotes the code generation task.

FIG. 13

| Type | Code |
|---|---|
| Source | Text: returns the string value of the specified field. the value is obtained from whichever scan contains the field.<br>Env: Scan s1; Scan s2; boolean hasField |
| CodeT5 | String function (String arg0){<br>  if (s1.hasField(arg0))<br>    return s1.getString(arg0);<br>  else return s2.getString(arg0);} |
| W/o MIP+IT | String function (String arg0){<br>  return s1.getString(arg0);} |

FIG. 14

| Methods | Span Prediction | | Identifier Prediction | |
|---|---|---|---|---|
| | Acc | Num match | Acc | Num match |
| MSP-only | 50.13 | 99.80 | 2.94 | 1.60 |
| MIP-only | 1.68 | 82.40 | 42.75 | 98.80 |
| MIP+MSP | 48.26 | 99.60 | 42.72 | 98.60 |

Table 7: Compare MSP and MIP objectives on span prediction and identifier prediction tasks using a subset of Java in CodeSearchNet. "Num match" denotes the ratio of how often the model can generate the same number of predictions as the sentinel tokens.

FIG. 15

SYSTEMS AND METHODS FOR CODE UNDERSTANDING AND GENERATION

CROSS-REFERENCE

The present application is a continuation of and claims priority under 35 U.S.C. 120 to co-pending and commonly-owned U.S. application Ser. No. 17/459,968 (issued as U.S. Pat. No. 11,782,686), which in turn is a nonprovisional of and claims priority under 35 U.S.C. 119 to U.S. provisional application No. 63/189,857, filed May 18, 2021, both of which are hereby expressly incorporated by reference herein in their entirety.

TECHNICAL FIELD

The embodiments relate generally to machine learning systems and natural language processing (NLP) models, and more specifically to an identifier-aware unified pre-trained encoder-decoder model for code understanding and generation.

BACKGROUND

Software developers may tend to employ informative identifier names to make the programing code more understandable. Such identifiers, e.g., "//initialization," "//computing stage," and/or the like, generally reserve rich semantics of a code snippet. To learn sematic information of code snippets, pre-trained models for Natural Languages (NL) such as BERT and GPT have been recently employed to transfer to Programming Languages (PL), which largely benefit a broad set of code-related tasks. However, most existing methods either rely on an encoder-only or a decoder-only pre-training mechanism. Thus, the pre-trained model is suboptimal for code understanding tasks when it is only pre-trained on encoders, or suboptimal for code generation tasks when it is only pre-trained on decoders. Or alternatively, the existing methods process the code snippet in the same way as NL, neglecting the special characteristics of PL such as token types.

Therefore, there is a need for an improved learning mechanism for code understanding and generation.

BRIEF DESCRIPTION OF THE DRAWINGS

FIGS. 7-15 provide example data tables illustrating example data performance of the code generation and understanding model described in relation to FIGS. 1-6, according to some embodiments described herein.

In the figures, elements having the same designations have the same or similar functions.

DETAILED DESCRIPTION

Pre-trained natural language models such as BERT and GPT may be applied with Programming Languages (PL) and can benefit a broad set of code-related tasks. The existing models typically employ a pre-train then fine-tune paradigm that derives generic language representations by self-supervised training on large-scale unlabeled data, which can be transferred to benefit multiple down-stream tasks, especially those with limited data annotation. However, most of these models rely on either an encoder-only model similar to BERT or a decoder-only model like GPT, which is suboptimal for generation and understanding tasks, respectively. For example, the CodeBERT model (described in Feng et al., Code-BERT: A pre-trained model for programming and natural languages, in Proceedings of the 2020 Conference on Empirical Methods in Natural Language Processing: Findings, pp. 1536-1547, 2020) requires an additional decoder when applied for the code summarization task, where this decoder cannot benefit from the pre-training. Besides, most existing methods simply employ the conventional NLP pre-training techniques on source code by regarding it as a sequence of tokens like natural language. This processing largely ignores the rich structural information in code, which is vital to fully comprehend the code semantics.

In view of the need for a learning mechanism for code understanding and generation, embodiments described herein a code generation and understanding model that builds on a Transformer-based encoder-decoder framework. Specifically, the code generation and understanding model is configured to consider token type information in the code. The code generation and understanding model is configured to derive generic representations for programming language (PL) and natural language (NL) in code domain via pre-training on unlabeled code corpus, and then to benefit many code-related downstream tasks with fine-tuning. Apart from the denoising sequence-to-sequence objectives widely adopted for pre-training on natural language, identifier tagging, and prediction pre-training objective is adopted to enable the model to better leverage the crucial token type information from PL, which specifically are the identifiers assigned by developers.

Figure 2:
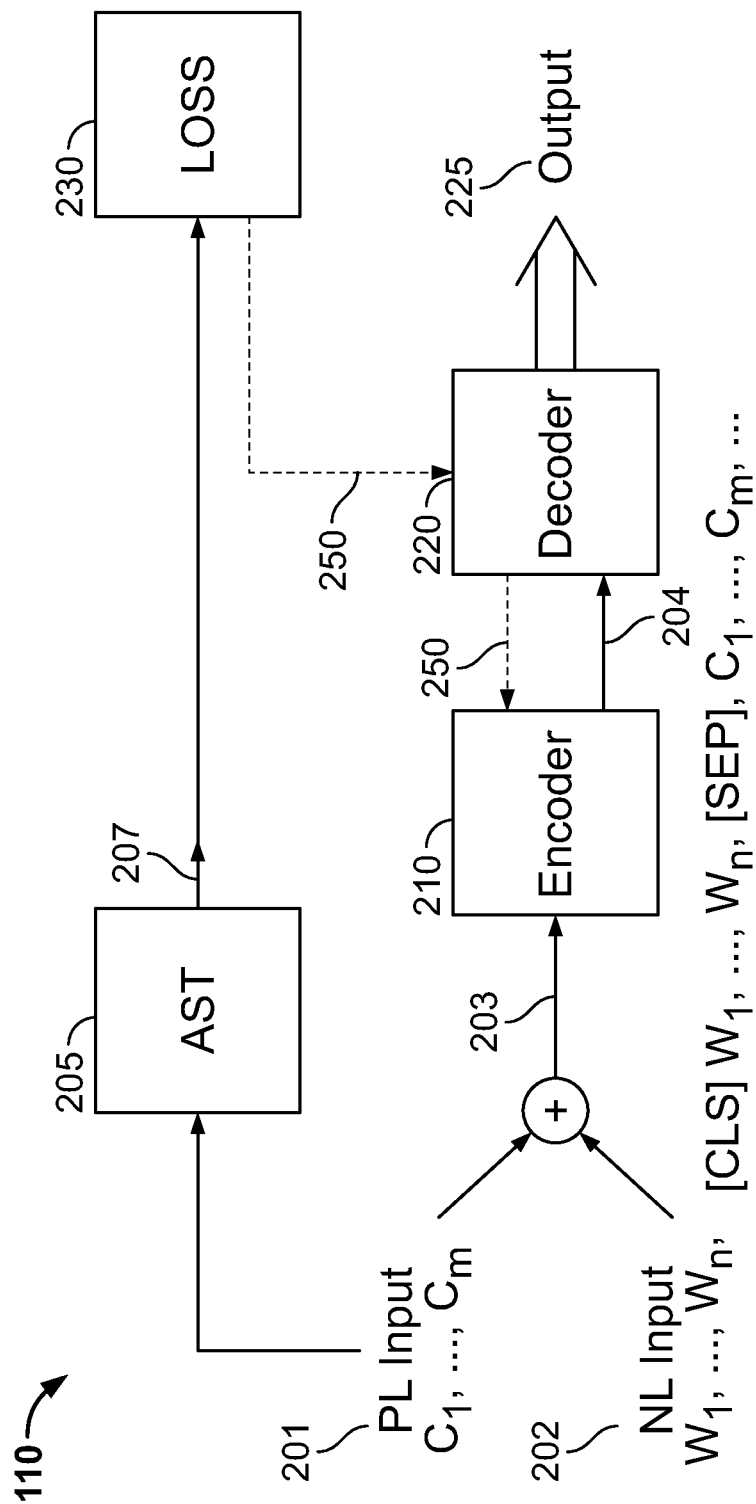
FIG. 2 is a simplified diagram illustrating an example architecture of the code generation and understanding module shown in FIG. 1, according to one embodiment described herein.

For example, when writing programs, developers tend to employ informative identifiers to make the code more understandable, so that these identifiers would generally reserve rich code semantics, e.g., the "binary Search" identifier in FIG. 2 directly indicates its functionality. To fuse such knowledge, an identifier-aware objective trains the model to explicitly distinguish which tokens are identifiers and recover them when they are masked.

In one embodiment, NL-PL alignment information may be extracted from the code and its accompanying comments. For example, developers often provide documentations to the programs for better software maintenance, so that such PL-NL pairs are naturally available in most source codes. Specifically, the NL-to-PL generation and PL-to-NL generation may be treated as dual tasks and the code generation and understanding model can be simultaneously optimized based on these dual tasks. In other words, a bimodal dual learning objective is adopted to encourage the NL-PL alignment.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
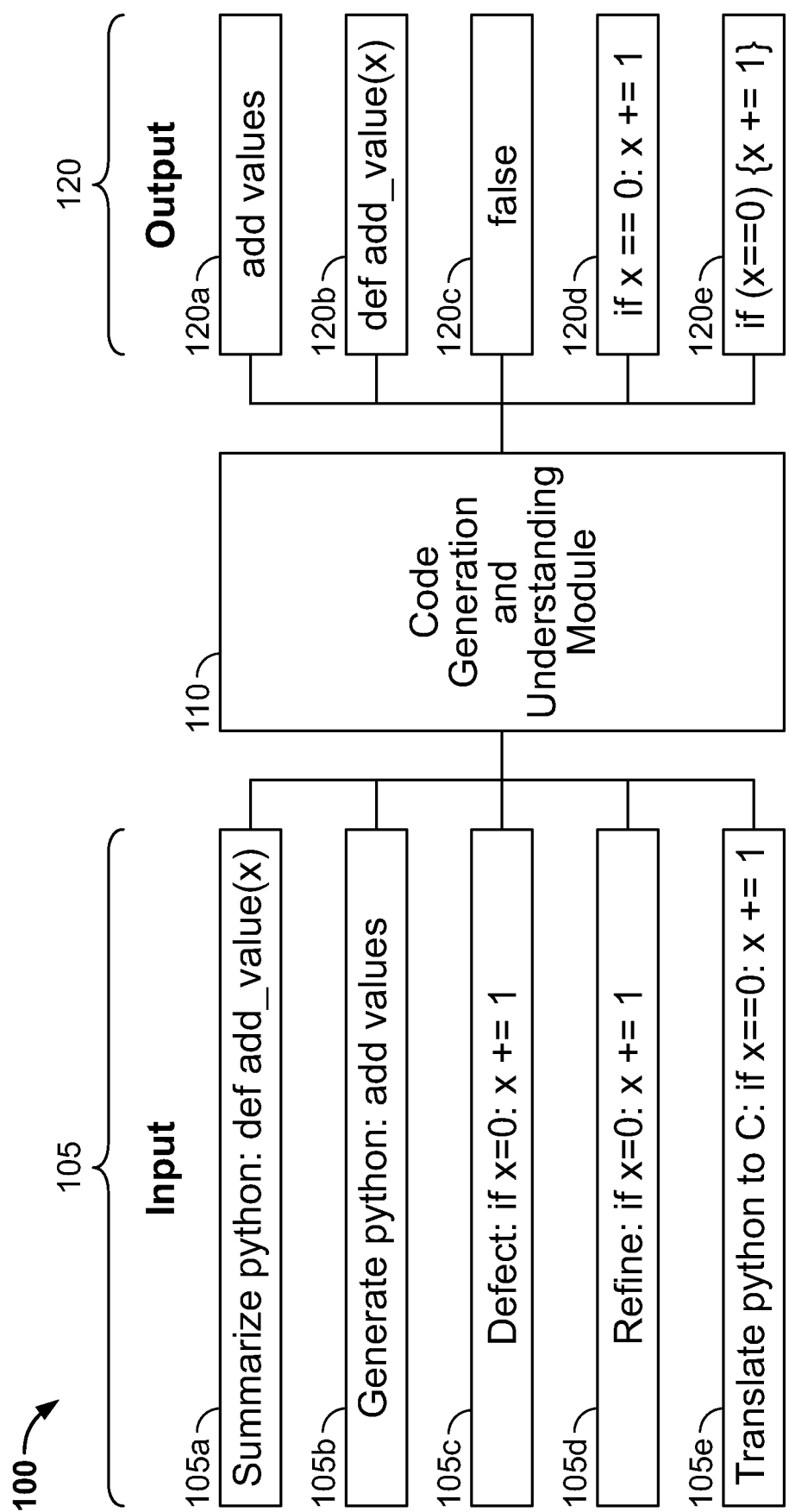
FIG. 1 is a simplified diagram illustrating example inputs and outputs, respectively, of the code generation and understanding module, according to one embodiment described herein.

FIG. 1 is a simplified diagram 100 illustrating example inputs 105a-e and outputs 120a-e, respectively, of the code generation and understanding module 110, according to one embodiment described herein. The code generation and understanding module 110 may generate a PL command output according to a NL input, or may generate a result that interprets a PL input.

For example, the code generation and understanding module 110 may transform the NL input 105a of "summarize python: def add_value(x)" to a corresponding PL output 120a in Python, respectively. For another example, the code generation and understanding module 100 may generate a NL result of "false" 120c, in response to the PL input 105c of "defect: if x=0: x+=1." In other words, the output 120c indicates a logic result from the code command in the PL input 105c.

FIG. 2 is a simplified diagram illustrating an example architecture of the code generation and understanding module 110 shown in FIG. 1, according to one embodiment described herein. The module 110 builds on an encoder-decoder framework comprising the encoder 210 and decoder 220. The encoder 210 receives a PL input 201 and/or a NL input 202, which is encoded into representations 204. The decoder 220 then constructs from the representations 204 to obtain an output 225, which may take a similar form of output 120a-e in FIG. 1.

At the pre-training stage, the module 110 may receive either PL-only or NL-PL as inputs depending on whether the code snippet has accompanying NL descriptions or not. For the NL-PL bimodal inputs, the NL and PL parts 202 and 201 are concatenated into a sequence 203 with a delimiter token [SEP] and represent the whole input sequence into the format as x=([CLS], $w_1, \ldots, w_n$, [SEP], $c_1, \ldots, c_m$, [SEP]), where n and m denote the number of NL word tokens and PL code tokens, respectively. The NL word sequence will be empty for PL-only unimodal inputs.

In order to capture more code-specific features, token type information is leveraged from code. Specifically, the type of identifiers (e.g., function names and variables) are identified as they are one of the most PL-agnostic features and reserve rich code semantics. The PL segment 201 may be converted into an Abstract Syntax Tree (AST) 205 and the node types are extracted for each code token. Then, a sequence of binary labels 207 $y \in \{0, 1\}^m$ may be constructed for the PL segment, where each $y_i \in \{0, 1\}$ represents whether the code token $c_i$ is an identifier or not.

Figure 3:
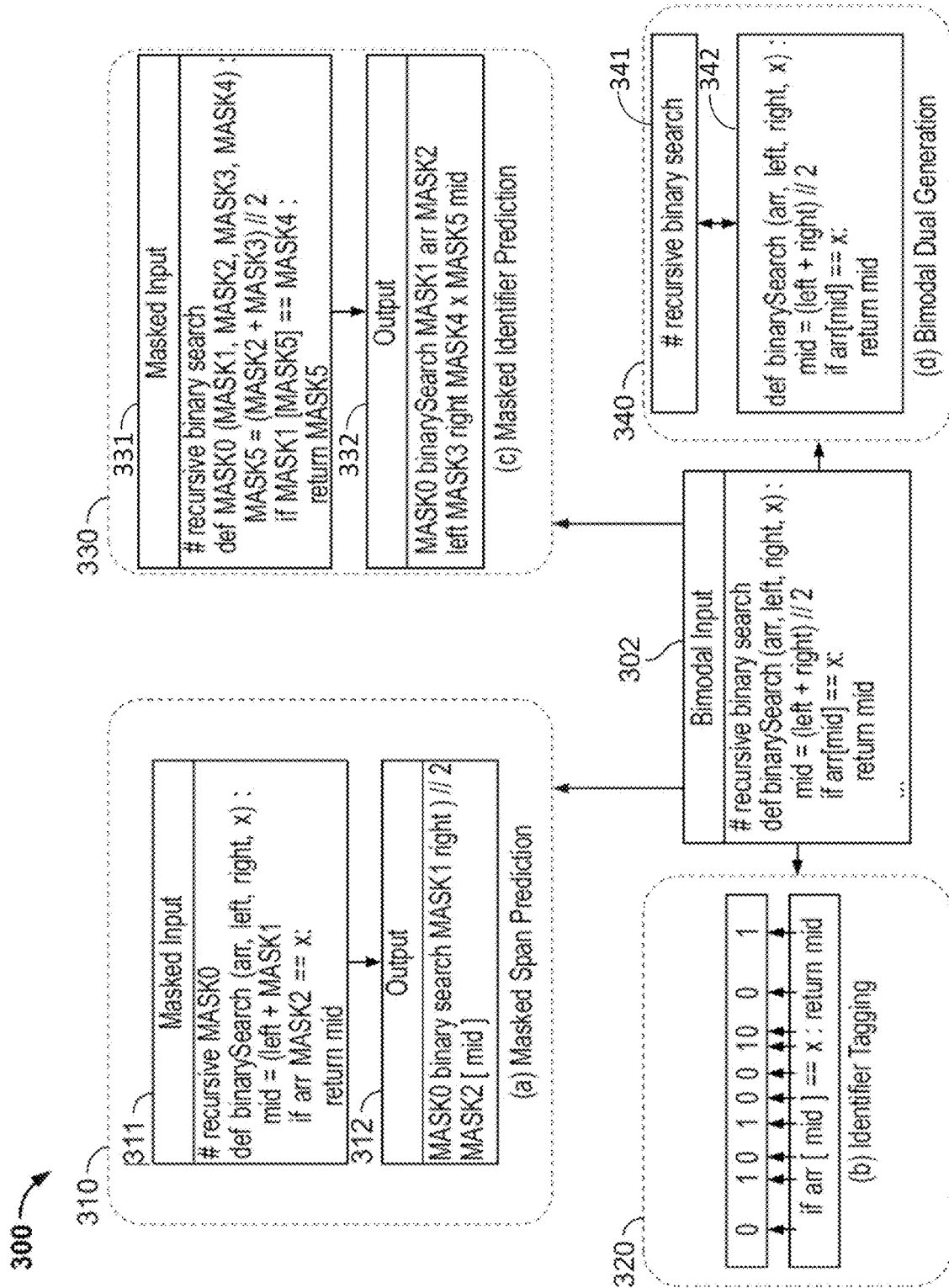
FIG. 3 is a simplified diagram illustrating pre-training tasks of the code generation and understanding module, according to one embodiment described herein.

Depending on the different types of pre-training tasks described in relation to FIG. 3, the decoder 220 may generate a predicted output 225, e.g., a predicted PL or NL output. The output 225 may be used to compute a loss 230 depending on the type of pre-training task, e.g. with the binary label 207. The loss 230 may be used to update the encoder-decoder structure via the backpropagation path 250.

FIG. 3 is a simplified diagram 300 illustrating pre-training tasks of the code generation and understanding module 110, according to one embodiment described herein. As shown at diagram 300, a bimodal input 302 may be used in a variety of pre-training tasks, such as masked span prediction 310, identifier tagging 320, masked identified prediction 330, bimodal dual generation 340, and/or the like. The bimodal input 302 may be generated in the first of a sequence similar to 203.

The masked span prediction pre-training 310 first corrupts the source sequence of the bimodal input 302 with some noising functions and then requires the decoder 220 to recover the masked text in the masked input 311. For example, the masked input 311 may generated by randomly masking spans with arbitrary lengths. The encoder 210 shown in FIG. 2 may encode the masked input 311 and the decoder 220 may then predict the output masked spans 312 combined with some sentinel tokens.

For example, 15% of the input tokens may be corrupted (e.g., 15% corruption rate) and the average span length may be set as 3 tokens by uniformly sampling spans from 1 to 5 tokens. Moreover, whole-word masking may be employed by sampling spans before subword tokenization, so as to avoid masking partial sub-tokens. In addition, the module 110 may be pre-trained for various PLs to learn robust cross-lingual representations. The masked span prediction loss may be computed as:

$$\mathcal{L}_{MSP}(\theta) = \Sigma_{t=1}^{k} -\log P_\theta(x_t^{mask}|x^{\backslash mask}, x_{<t}^{mask}), \quad (1)$$

where $\theta$ are the model parameters, $x^{\backslash mask}$ is the masked input, $x_t^{mask}$ is the masked sequence predicted from the decoder with k denoting the number of tokens in $x_t^{mask}$, and $x_{<t}^{mask}$ denotes the span sequence generated so far, e.g., before time instance t.

The pre-training task of identifier tagging 320 is configured to train the module 110 with the knowledge on whether this code token is an identifier or not, which shares a similar spirit of syntax highlighting in some developer-aided tools. Specifically, as shown at 320, the final hidden states corresponding to a PL segment input at the encoder 210 is represented as a sequence of probabilities $p=(p_1, \ldots, p_m)$, and a binary cross entropy loss is computed for sequence labeling, e.g., between the final hidden states and the binary labels 207:

$$\mathcal{L}_{IT}(\theta_e) = \Sigma_{m=1}^{m} -[y_i \log p_i + (1-y_i)\log(1-p_i)], \quad (2)$$

where $\theta_e$ are the encoder parameters. Note that by casting the task as a sequence labeling problem, the model is expected to capture the logical and the data flow structures of the code.

The pre-training task of masked identifier prediction 330 may generate a masked input in a different manner from the random span masking in masked span prediction 310. Specifically, all identifiers in the PL segment are masked, and a unique sentinel token is employed for all occurrences of one specific identifier. For example, as shown in the masked input 331, tokens "MASK0," "MASK1," and so forth are used to mask the specific function or variable names. In the field of software engineering, this is called obfuscation where changing identifier names does not impact the code semantics.

The unique identifiers are then arranged with the sentinel tokens into a target sequence I of masked input 331. The masked input 331 is then encoded by the encoder 210, and the decoder 220 generate a prediction output 332 in an auto-regressive manner. In this way, the loss may be computed as:

$$\mathcal{L}_{MIP}(\theta) = \Sigma_{t=1}^{|I|} -\log P_\theta(I_j|x^{\backslash I}, I_{<j}), \quad (3)$$

where $x^{\setminus v}$ is the masked input. Note that deobfuscation is a more challenging task that requires the model 110 to comprehend the code semantics based on obfuscated code and link the occurrences of the same identifiers together.

The three losses $\mathcal{L}_{MSP}$, $\mathcal{L}_{IT}$, $\mathcal{L}_{MIP}$ of the three pre-training tasks 310, 320 and 330 may be alternately employed in pre-training with an equal probability, which constitutes an identifier-aware denoising pre-training. In another embodiment, a weighted sum of the three losses $\mathcal{L}_{MSP}$, $\mathcal{L}_{IT}$, $\mathcal{L}_{MIP}$ may be computed to jointly update the model 110.

In the pre-training phase, the decoder 220 in FIG. 2 only sees discrete masked spans and identifiers, which is disparate from the down-stream tasks where the decoder 220 often needs to generate either fluent NL texts or syntactically correct code snippets. To close the gap between the pre-training and fine-tuning, the NL-PL bimodal data is leveraged to train the model 110 for a bidirectional conversion. Specifically, the bimodal dual generation pre-training 340 regards the NL-to-PL generation and PL-to-NL generation as dual tasks and simultaneously optimize the model 110 on the dual tasks. For example, for each NL-PL bimodal data input, e.g., comprising NL segment 341 and PL segment 342, two training instances are constructed with reverse directions. For example, one NL-to-PL training instance may be the NL input segment 341 corresponding to the ground-truth PL segment 342 such that the model 110 is supposed to predict an output PL segment in response to the input NL segment 341. The predicted output PL segment is then compared with the ground-truth PL segment 342 to compute a loss for updating the model 110. The dual PL-to-NL training instance may be the PL input segment 342 corresponding to the ground-truth NL segment 341 such that the model 110 is supposed to predict an output NL segment in response to the input PL segment 342. The predicted output NL segment is then compared with the ground-truth NL segment 341 to compute a loss for updating the model 110. The losses generated from dual training instances may be employed alternately to update the model 110, or as a combined weighted sum to update the model 110.

Language identifiers, e.g., <java> and <en> for Java PL and English NL, respectively, may be added to the dual training instances. This operation can be also seen as a special case of span masking by either masking the full NL or PL segment from the bimodal inputs. By training the model 110 using the dual training pairs, the alignment between the NL and PL counterparts may be improved.

In one embodiment, after pre-training on large-scale unlabeled data (e.g., using the pre-training tasks 310, 320, 330, 340 described in FIG. 3), the code generation and understanding model 110 may be fine-tuned to downstream tasks via either task-specific transfer learning or multi-task learning.

For example, in task-specific transfer learning, specific generation and/or understanding tasks may be employed. Code-related tasks can be categorized into generation and understanding tasks. For generation tasks, the model 110 can be naturally adapted with its Seq2Seq framework. For understanding tasks, training labels may be generated as a unigram target sequence, e.g., as described in Raffel et al., 2020. Or alternatively, training labels may be predicted from the vocabulary of class labels based on the last decoder hidden state, as described in Lewis et al., BART: denoising sequence-to-sequence pre-training for natural language generation, translation, and comprehension, in Proceedings of the 58th Annual Meeting of the Association for Computational Linguistics, pp. 7871-7880, Jul. 5-10, 2020.

In one embodiment, a multi-task learning setting may be adopted by training a shared model on multiple tasks at a time. Multi-task learning is able to reduce computation cost by reusing the most of model weights for many tasks and has been shown to improve the model generalization capability in NL pre-training. Specifically, a unified model may be employed for all tasks without adding any task-specific networks but allow to select different best checkpoints for different tasks. To notify the model with which task it is dealing with, a unified format of task control codes is used and prepended into the source inputs as shown in FIG. 1. For instance, the codes "Translate Python to C" is prepended to input 105e in FIG. 1, as the source prompt for the code-to-code translation task from Python to C.

In multi-task learning, as different tasks may have different dataset sizes, a balanced sampling strategy may be adopted. For example, for N number of datasets (or tasks), with probabilities $\{q_i\}_{i=1}^{N}$, the following multinomial distribution is computed to sample from:

$$q_i = \frac{r_i^\alpha}{\sum_{j=1}^{N} r_j^\alpha}, \text{ where } r_i = \frac{n_i}{\sum_{k=1}^{N} n_k}. \tag{4}$$

where $n_i$ is number of examples for i-th task and a is set to a constant, such as 0.5, 0.6, 0.7, and/or the like. This balanced sampling alleviates the bias high-resource tasks.

Figure 4:
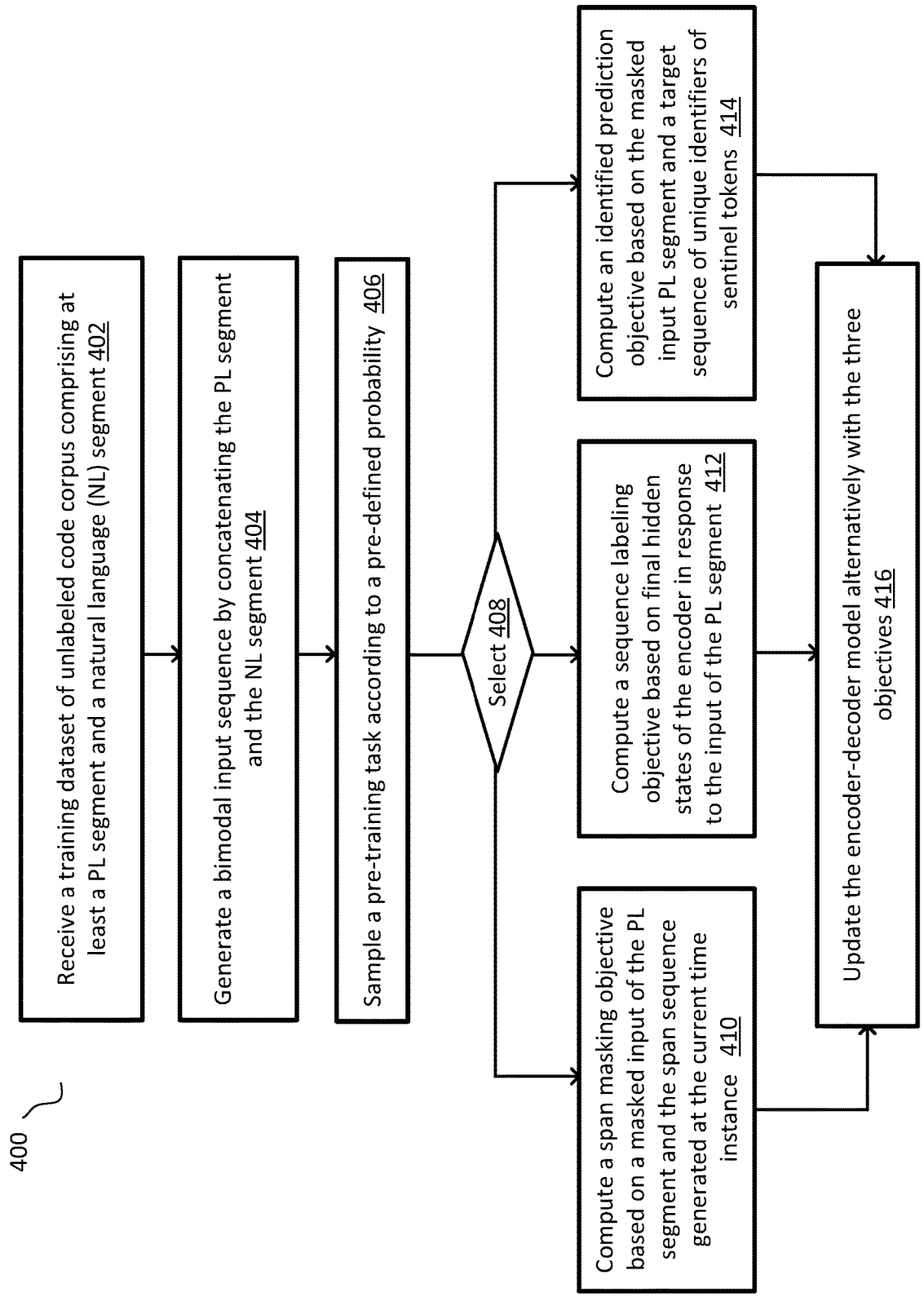
FIG. 4 is a simplified workflow diagram of a method for training a unified encoder-decoder framework for code generation and understanding, according to some embodiments.

FIG. 4 is a simplified work flow diagram of a method 400 for training a unified encoder-decoder framework for code generation and understanding, according to some embodiments. One or more of the processes 402-416 of method 400 may be implemented, at least in part, in the form of executable code stored on non-transitory, tangible, machine-readable media that when run by one or more processors may cause the one or more processors to perform one or more of the processes 402-416.

Figure 6:
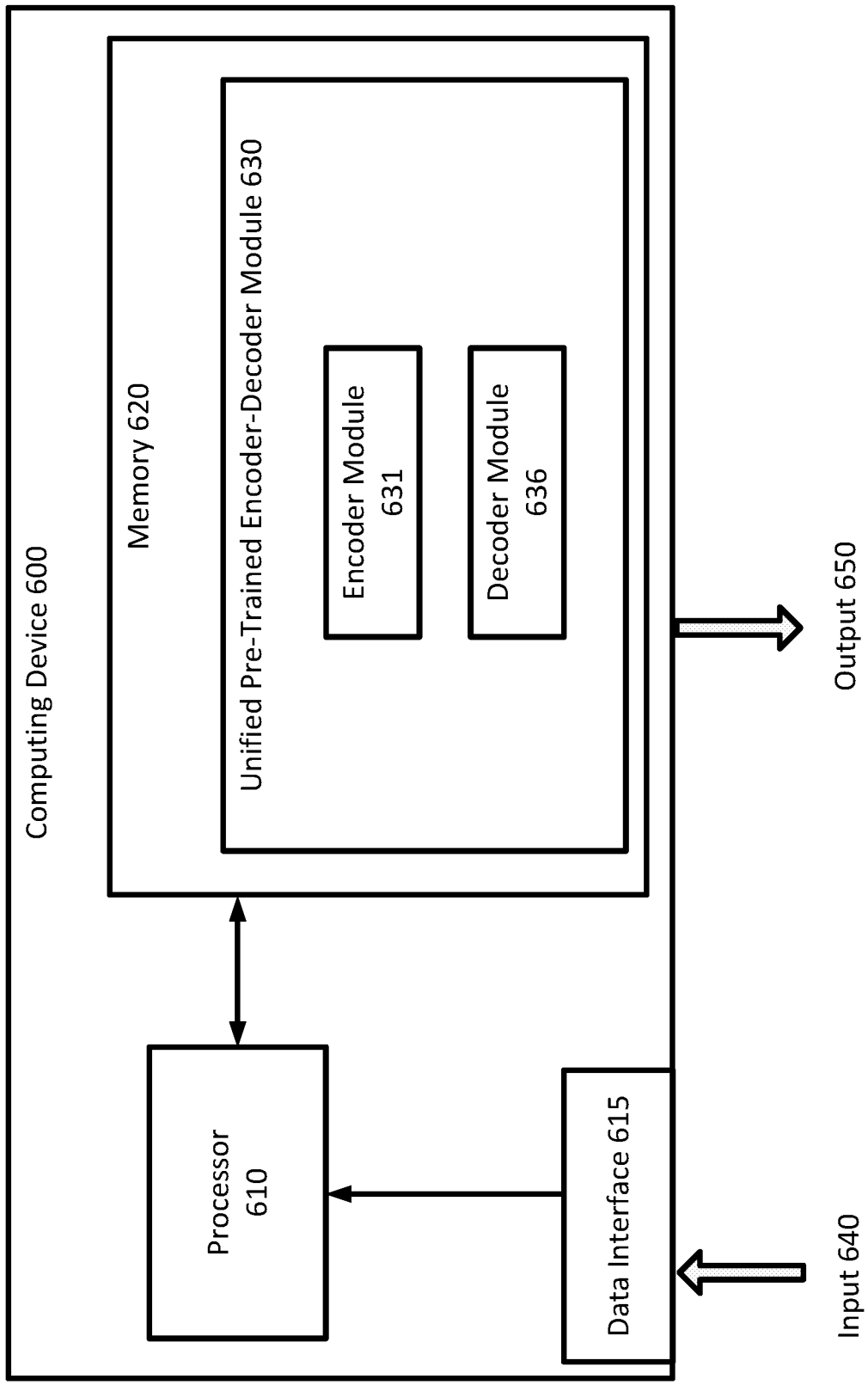
FIG. 6 is a simplified diagram of a computing device that implements the unified pre-trained encoder-decoder framework, according to some embodiments described herein.

At step 402, a training dataset of unlabeled code corpus comprising at least a PL segment (e.g., 201) and a NL segment (e.g., 202) may be received, e.g., via communication interface 615 in FIG. 6.

At step 404, a bimodal input sequence (e.g., 203 in FIG. 2) may be generated by concatenating the PL segment and the NL segment.

At step 406, the encoder-decoder model (e.g., 110 in FIGS. 1-2) may sample a pre-training task according to a pre-defined probability. The pre-defined probability may be equal for each pre-training task.

At step 408, a sampled pre-training task may be selected for pre-training.

For example, at step 410, the selected pre-training task may be the masked span prediction task 310 in FIG. 3. Then a predicted output is generated by randomly masking a plurality of spans in the bimodal input sequence, encoding, by an encoder (e.g., 210 in FIG. 2) the masked bimodal input sequence (e.g., 311 in FIG. 3) into a first representation, and generating, by the decoder (e.g., 220 in FIG. 2), a predicted masked sequence conditioned on the masked bimodal input sequence and a set of previously predicted masked sequences up to a current time instance. The training objective is the masked span prediction loss computed based on a conditional probability distribution of the masked bimodal input sequence and a set of previously predicted masked sequences up to a current time instance, e.g., Eq. (1).

For another example, at step 412, the selected pre-training task may be the identifier tagging task 320 in FIG. 3. Specifically, the PL segment is converted into an Abstract Syntax Tree (e.g., AST 205 in FIG. 2), and based on the AST, a sequence of binary labels (e.g., 207 in FIG. 2) is constructed. Each binary label represents whether a respective code token in the PL segment is an identifier. The predicted output is generated by encoding, by an encoder (e.g., 210 in FIG. 2), the bimodal input sequence into a first representation; and mapping final hidden states corresponding to the PL segment in the encoder into a sequence of probabilities. The training objective is the identifier tagging loss computed based on a binary cross-entropy loss between the sequence of probabilities and the sequence of binary labels, e.g., Eq. (2).

For another example, at step 414, the selected pre-training task may be the masked identifier prediction task 330 in FIG. 3. Then the predicted output is generated by masking a plurality of identifiers in the PL segment of the bimodal input sequence, wherein a designated mask token is used for a specific identifier; encoding, by an encoder (e.g., 210 in FIG. 2) the masked bimodal input sequence (e.g., 331 in FIG. 3) into a first representation; and generating, by the decoder (e.g., 220 in FIG. 2), a target sequence (e.g., 332 in FIG. 3) comprising the masked plurality of identifiers and corresponding designated mask tokens. The first training objective is the masked identifier prediction loss computed based on a conditional probability of each token in the target sequence conditioned on the masked bimodal input sequence and tokens previously generated for the target sequence up to the respective token, e.g., Eq. (3).

In addition, the encoder-decoder model may select the pre-training task of bimodal dual generation 340 in FIG. 3 (not shown in FIG. 4). For example, the PL segment may be input to the encoder-decoder model to generate a predicted NL segment, and a first loss is compared by comparing the predicted NL segment and the NL segment. The NL segment is then input to the encoder-decoder model to generate a predicted PL segment, and a second loss is computed by comparing the predicted PL segment and the PL segment. A combined bimodal dual generation loss may be computed as the sum of the first loss and the second loss.

At step 416, the encoder-decoder model may be alternately updated based on the different training objectives described above according to the pre-defined probability. Alternatively, the encoder-decoder model may be jointly updated based on a sum of the all the training objectives.

Figure 5:
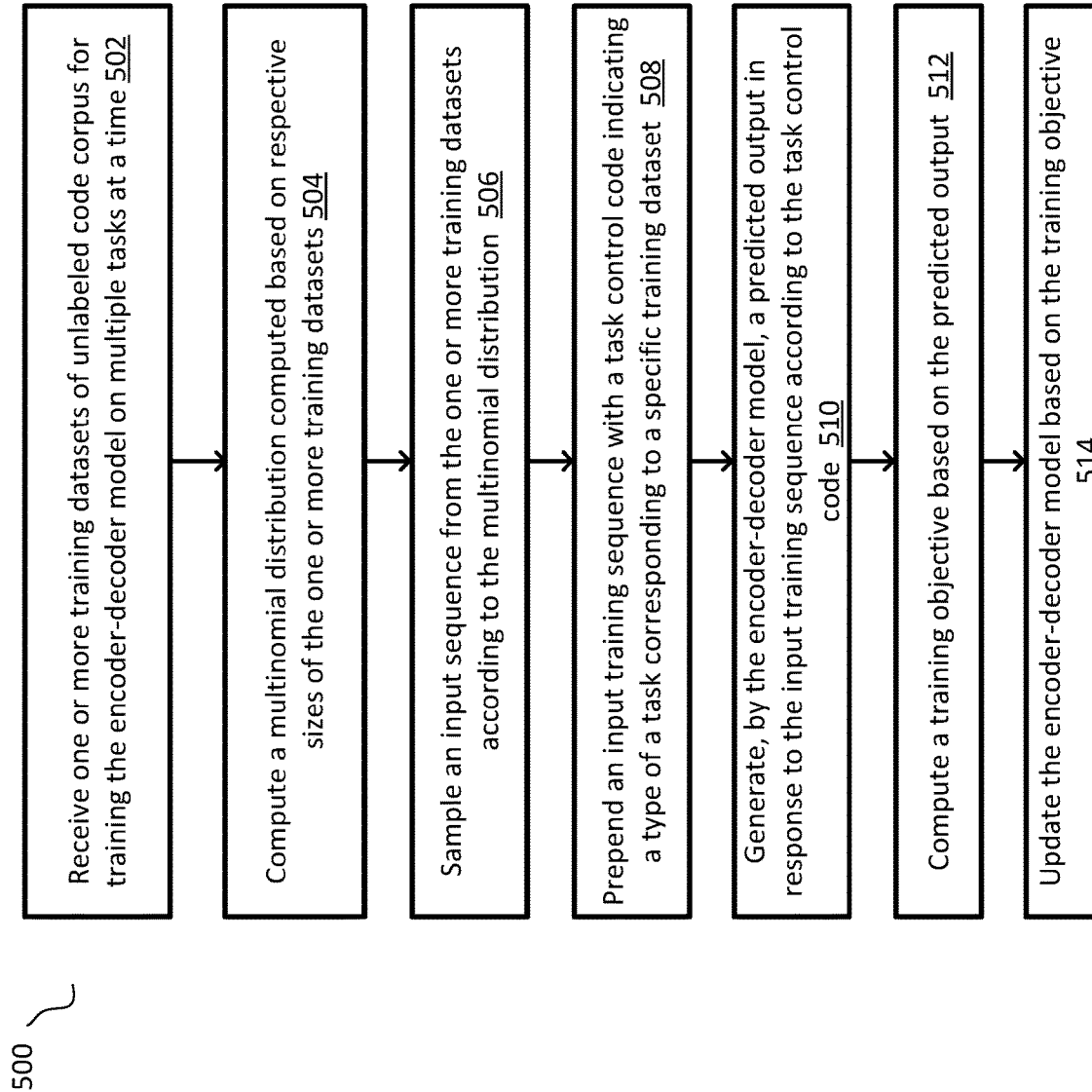
FIG. 5 is a simplified workflow diagram of a method for fine-tuning a unified encoder-decoder framework in multi-task learning, according to some embodiments.

FIG. 5 is a simplified workflow diagram of a method 500 for fine-tuning a unified encoder-decoder framework in multi-task learning, according to some embodiments. One or more of the processes 502-514 of method 500 may be implemented, at least in part, in the form of executable code stored on non-transitory, tangible, machine-readable media that when run by one or more processors may cause the one or more processors to perform one or more of the processes 502-514.

At step 502, one or more training datasets of unlabeled code corpus may be received for training the encoder-decoder model on multiple tasks at a time. For example, as shown in FIG. 1, data corpus 105a relates to a code summarization task and data corpus 105b relates to a code generation task, and so on.

At step 504, a multinomial distribution is computed based on respective sizes of the one or more training datasets, e.g., Eq. (4).

At step 506, an input sequence is sampled from the one or more training datasets according to the multinomial distribution.

At step 508, an input training sequence is prepended with a task control code (e.g., "Summarize python" in 105a in FIG. 1) indicating a type of a task corresponding to a specific training dataset.

At step 510, the encoder-decoder model generates a predicted output in response to the input training sequence according to the task control code.

At step 512, a training objective is computed based on the predicted output.

At step 514, the encoder-decoder model is updated based on the training objective. Method 500 may repeat at 506 to train the model with another sampled input sequence.

FIG. 6 is a simplified diagram of a computing device that implements the unified pre-trained encoder-decoder framework, according to some embodiments described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for a unified pre-trained encoder-decoder module 630 that may be used to implement and/or emulate the systems and models, and/or to implement any of the methods described further herein. In some examples, the unified pre-trained encoder-decoder module 630, may receive an input 640, e.g., such as a code snippet in PL, or a NL input describing a task, via a data interface 615. The data interface 615 may be any of a user interface that receives a user uploaded image instance, or a communication interface that may receive or retrieve a previously stored PL or NL sample from the database. The unified pre-trained encoder-decoder module 630 may generate an output 650, such as a PL code command in response to a NL input 640 describing a task.

In some embodiments, the unified pre-trained encoder-decoder module 630 may further include an encoder module 631 and a decoder module 632, e.g., similar to the encoder 210 and decoder 220 in FIG. 2. In some examples, the unified pre-trained encoder-decoder module 630 and the sub-modules 631-632 may be implemented using hardware, software, and/or a combination of hardware and software.

Some examples of computing devices, such as computing device 600 may include non-transitory, tangible, machine readable media that include executable code that when run by one or more processors (e.g., processor 610) may cause the one or more processors to perform the processes of method 400-500. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

EXAMPLE DATA EXPERIMENTS AND PERFORMANCE

In one embodiment, an example pre-training dataset may be CodeSearchNet described in Husain et al., Code-search-net challenge: Evaluating the state of semantic code search, CoRR, abs/1909.09436, 2019, which consists of six PLs with both unimodal and bimodal data. Table 1 in FIG. 7 shows some basic statistics of CodeSearchNet. In addition, two datasets of C/CSharp from BigQuery2 are collected to ensure that all downstream tasks have overlapped PLs with the pre-training data. In total, around 8.35 million instances are used for pre-training. To obtain the identifier labels from code, the tree-sitter is leverated to convert the PL into an abstract syntax tree and then extract its node type information. It is observed that PLs have different identifier rates, e.g., Go has the least rate of 19% and Ruby has the highest rate of 32%.

Tokenization is an ingredient for the success of pre-trained language models like BERT and GPT. They often employ a Byte-Pair Encoding (BPE) tokenizer to alleviate the Out-of-Vocabulary (OoV) issues. Specifically, a Byte-level BPE tokenzier is trained following with a vocabulary size to 32,000. Additional special tokens such as ([PAD], [CLS],[SEP], [MASK0], . . . , [MASK99]) are added. This tokenzier is trained on all of the pre-training data with non-printable characters and low-frequent tokens (occurring <3 times) filtered. This tokenization method is compared with T5's default tokenizer and shows to largely reduce the length of tokenized code sequence by 30%-45% on downstream tasks. This will accelerate the training and especially benefit generation tasks due to the shorter sequence to predict. In fact, in some situations, T5 tokenizer may encode some common code tokens such as brackets ['{', '}'] into unknown tokens.

The code generation and understanding model 110 is configured to cover a variety of generation and understanding tasks in CodeXGLUE (as described in Lu et al., Codexglue: A machine learning bench-mark dataset for code understanding and generation, CoRR, abs/2102.04664, 2021) and employ the provided public datasets and the same data splits following CodeXGLUE for all these tasks. For example, two cross-modal generation tasks are considered. Code summarization aims to summarize a function-level code snippet into English descriptions. The dataset consists of six PLs including Ruby, JavaScript, Go, Python, Java, and PHP. The smoothed BLEU-4 described in Lin et al, ORANGE: a method for evaluating automatic evaluation metrics for machine translation, in COLING 2004, 20th International Conference on Computational Linguistics, Proceedings of the Conference, 23-27 Aug. 2004, Geneva, Switzerland, 2004), is employed to evaluate this task. Code generation is the task to generate a code snippet based on NL descriptions. The Concode data described in Iyer et al., Mapping language to code in programmatic context, in Proceedings of the 2018 Conference on Empirical Methods in Natural Language Processing, Brussels, Belgium, Oct. 31-Nov. 4, 2018, pages 1643-1652, 2018, in Java where the input contains both NL texts and class environment contexts, and the out-put is a function. This task is evaluated with BLEU-4, exact match (EM) accuracy, and CodeBLEU (as described in Ren et al., Codebleu: a method for automatic evaluation of code synthesis, CoRR, abs/2009.10297, 2020) that considers syntactic and semantic matches based on the code structure.

Two PL-PL generation tasks may be employed. Code translation aims to migrate legacy software from one PL to another, which focuses on translating codes from Java to CSharp and vice versa. Code refinement aims to convert a buggy code into a correct one. Two Java datasets are employed with various function lengths (small and medium). BLEU-4 and exact match are employed to evaluate these tasks.

The performance of the module 110 on understanding-based tasks is also experimented. The first task is clone detection which aims to measure the similarity between two code snippets and predict whether they have the same functionality. The second one is defect detection that aims to predict whether a code is vulnerable to software systems or not. F1 score and accuracy are used for evaluation. In general, the module 110 supports six tasks and fourteen sub-tasks with a unified encoder-decoder model.

The code generation and understanding model 110 is compared with state-of-the-art (SOTA) pre-trained models that can be categorized into three types: encoder-only, decoder-only, and encoder-decoder models. For example, the encoder-only models include RoBERTa (described in Liu et al., Roberta: A robustly optimized BERT pretraining approach, CoRR, abs/1907.11692., 2019), RoBERTa (code) trained with masked language modeling (MLM) on code, CodeBERT (described in Feng et al., Code-bert: A pre-trained model for programming and natural languages, in Proceedings of the 2020 Conference on Empirical Methods in Natural Language Processing: Findings, EMNLP 2020) trained with both MLM and replaced token detection (described in Clark et al., ELECTRA: pre-training text encoders as discriminators rather than generators. In 8th International Conference on Learning Representations, ICLR 2020, Addis Ababa, Ethiopia, Apr. 26-30, 2020), GraphCode-BERT (described in Guo et al., Graphcodebert: Pre-training code representations with data flow, CoRR, abs/2009.08366, 2020) using data flow from code, and DOBF (described in Rozière et al., Unsupervised translation of programming languages. In Advances in Neural Information Processing Systems 33: Annual Conference on Neural Information Processing Systems, 2020) trained with the identifier deobfuscation objective. Note that although DOBF employs a Seq2Seq model during pre-training, it only aims to train a better encoder for downstream tasks without exploring the potential benefit of the pre-trained decoder.

Decoder-only models include GPT-2 (described in Radford et al., Language models are unsupervised multitask learners. OpenAI blog, 1(8):9, 2019) and its adaptations on code domain including CodeGPT-2, and CodeGPT-adapted. The difference is that the latter one utlizes a GPT-2 checkpoint for model initialization while the former one is trained from scratch. For encoder-decoder models, the current SOTA model for the CodeXGLUE benchmark is PLBART (described in Ahmad et al., Unified pre-training for program understanding and generation, CoRR, abs/2103.06333, 2021) based on BART architecture. For pre-training data, most of these models employ CodeSearchNet except DOBF and PLBART. DOBF is pre-trained on 7.9 M Java and 3.6 M Python files from BigQuery while PLBART employs a much larger data with 470 M Python and 210 M Java functions, and 47 M NL posts from StackOverflow.

In one embodiment, the code generation and understanding model 110 (referred to as "CodeT5") may be built based on Huggingface's T5 (described in Raffel et al., Exploring the limits of transfer learning with a unified text-to-text trans-former. J. Mach. Learn. Res., 21:140:1-140:67, 2020) implementation and employ two sizes of CodeT5-samll (60 M) and CodeT5-base (220M). The maximum source and target sequence lengths are set to be 512 and 256, respectively. To accelerate the pre-training, distributed data parallel and the mixed precision of FP16 are used. The batch size is set to 1024 and the peak learning rate is set to be 2e-4 with linear decay. The model is pre-trained with the denoising objective for 100 epochs and bimodal dual training for further 50 epochs on a cluster of 16 NVIDIA A100 GPUs with 40G memory. The total training time for CodeT5-small and CodeT5-base is 5 and 12 days, respectively.

In the fine-tuning phase, the tasks in CodeXGLUE are found to be quite sensitive to some hyper parameters such as learning rate, training steps, and batch sizes. A grid search is conducted to select the best parameters based on the validation set. In multi-task learning, all downstream tasks are covered except clone detection.

In one embodiment, two sizes of the code generation and understanding model 110 are evaluated, referred to as the CodeT5-small and CodeT5-base that are pre-trained with identifier-aware denoising. In addition, the model continues to train with bimodal dual generation (dual-gen) and show the results with multi-task fine-tuning. The results of all comparison models are obtained from their original papers and also the CodeXGLUE paper.

For the task of code summarization, Table 2 in FIG. 8 shows code summarization results of smoothed BLEU-4 on six PL data. All variants of the code generation and understanding model 110 significantly outperform prior work with either an encode-only (RoBERTa, CodeBERT, DOBF) or encoder-decoder framework (PLBART). Moreover, the salient performance gap between these two groups of models confirms that encode-only frame-work is suboptimal for generation tasks. Compared to the SOTA encoder-decoder model PLBART, even CodeT5-small yields better overall scores (also on Python and Java) given that our model is much smaller (60 M vs. 140 M) and PLBART is pre-trained with much larger Python and Java data (>100 times). Such improvement may be attributed to the identifier-aware denoising pre-training and better employment of bimodal training data, as described in FIGS. 1-5. By increasing the size of model, the CodeT5-base boosts the overall performance by over one absolute point over PLBART.

For the task of code generation, Table 3 in FIG. 9 compares CodeT5 with GPT-style models and PLBART. The CodeT5-small outperforms all decoder-only models and yields comparable results with PLBART, which again confirms the superiority of encoder-decoder models at generating code snippets. Moreover, the CodeT5-base further significantly pushes the SOTA results across three metrics. Particularly, it achieves improvement of 2.3 points on CodeBLEU over PLBART, indicating the CodeT5 can better comprehend the code syntax and semantics with the help of identifier-aware pre-training.

For code-to-code generation tasks, Table 4 in FIG. 10 compares two code-to-code generation tasks: code translation and code refinement and further consider one naive copy baseline by copying the source in-put as the target prediction. In the code translation task, the CodeT5-small outperforms most of base-lines and obtains comparable results with PLBART, which shows the advantages of encoder-decoder models in the code-to-code generation setting. The CodeT5-base further achieves consistent improvements over PLBART across various metrics for translating from Java to C# and vice versa.

An example model output of translating C# to Java in show in FIG. 12. In this case, despite the poor BLEU score, CodeT5 is able to generate a function that re-serves the same functionality and even has better readability compared to the ground-truth. This also reveals that BLEU score is not a perfect evaluation metric for code-to-code generation tasks.

The challenging task of code refinement requires to detect which parts of code are buggy and fix them via generating a bug-free code sequence. Due to the large overlap of source and target code, even the naive copy approach yields very high BLEU scores but zero exact matches. Therefore, exact match (EM) metric is used to evaluate on this task. As shown in Table 4 of FIG. 10, EM scores for the small data are consistently higher than the medium one, indicating that it is harder to fix bugs for a longer code snippet. The CodeT5-base significantly outperforms all baselines on EM and especially boosts over 3 points for the more challenging medium data task (12.33 vs. GraphCodeBERT's 9.10), reflecting its strong code understanding capability.

For understanding tasks, Table 5 in FIG. 11 compares with two understanding tasks of defect detection and clone detection. Specifically, the binary labels are generated as a unigram sequence from the decoder for the defect detection task, while for the clone detection task, the sequence embedding of each code snippet is obtained using the last decoder state and then to predict the labels by measuring their similarity. Both CodeT5-small and CodeT5-base outperform all baselines on the defect detection task while CodeT5-base yields over 1.5 accuracy scores than the SOTA PLBART. For the clone detection task, CodeT5 models achieve comparable results to the SOTA GraphCodeBERT and PLBART models. These results demonstrate that with an encode-decoder framework, our CodeT5 can still be adapted well for understanding tasks.

The effects of bimodal dual generation are further examined at pre-training and multi-task learning at fine-tuning. The bimodal pre-training brings consistent improvements for code summarization and generation tasks on both CodeT5-small and CodeT5-base. In multi-task learning, it generally improve most of downstream tasks except the code translation and defect detection. Particularly, it largely boosts the performance on code summarization, which might be due to the fact that code summarization tasks take up the largest portion of sub tasks (six out of thirteen), which would benefit the most from the multi-task learning. Another interesting observation is that multi-task learning significantly improve the code refinement performance. One possible reason is that multi-task training with defect detection would enable the model to better comprehend the code semantics for bug detection, which is also a necessary step for code refinement.

In one embodiment, four tasks are selected to show the performance of our CodeT5-small model by ablating each of the three objectives: masked span prediction (MSP), identifier tagging (IT), and masked identifier pre-diction (MIP). As shown in Table 6 of FIG. 13, generally removing one of the objectives would reduce the performance for all tasks, indicating that all objectives contribute to the better code understanding of the CodeT5. However, the effect of each objective differs across tasks. Specifically, removing MSP objective would largely reduce the performance of all generation tasks but instead increase the defect detection performance. This shows that span prediction is more crucial for capturing syntactic information for generation tasks. Instead, removing MIP objective would hurt the defect detection task the most, indicating that it might focus more on code semantics. By combining these objectives, CodeT5 can better capture both syntactic and semantic information from PL.

Outputs from CodeT5 and its variant without MIP and IT on code generation are shown in FIG. 14. CodeT5 can correctly generate the exact function, while the model without MIP and IT fails to recover the identifiers of "s2" and "hasField". This shows our identifier-aware denoising pre-training can better distinguish and leverage the identifier information.

The identifier tagging performance is further examined and it achieves over 99% F1 for all PLs, showing that our CodeT5 can confidently distinguish identifiers in code. It is also checked whether span prediction (SP) and identifier prediction (IP) would have conflicts as they employ the same sentinel tokens for masking. In identifier masking, all occurrences of one unique identifier are replaced with the same sentinel token, resulting in a many-to-one mapping compared to the one-to-one mapping in span prediction. The results of the models pre-trained with either MSP or MIP objectives, or both on the SP and IP tasks in Table 7 of FIG. 15.

Prediction accuracy and also the ratio of how often they can generate the same number of predictions as the sentinel tokens are reported. It is observed that pre-training only with either MIP or MSP would bias the model towards that task, achieving poor accuracy and higher mismatch in number of predictions when applied to the other task. In some situations, it is observed that MIP-only objective can better recover the correct number of predictions in the SP task than MSP-only does for the IP task, meaning that it is easier to adapt from the many-to-one to one-to-one mapping and difficult for the opposite. In general, combining all the training objectives can help the code generation and understanding model 110 to make a good trade-off on both tasks.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for programming language (PL) generation and understanding using an encoder-decoder model, the method comprising:
generating, by a neural network model, a first predicted output in response to a bimodal input sequence comprising a PL segment and a natural language (NL) segment according to a first pre-training task, wherein the first predicted output is generated by:
masking a plurality of identifiers in the PL segment of the bimodal input sequence to generate a masked bimodal input sequence, wherein a designated mask token is used for a specific identifier of the plurality of identifiers,
encoding, by an encoder of the neural network model, the masked bimodal input sequence into a first representation, and
generating, by a decoder of the neural network model, a target sequence comprising the masked plurality of identifiers and corresponding designated mask tokens, from the first representation to generate the first predicted output
wherein the PL segment and the NL segment belong to an unlabeled code sample;
computing a first training objective based on the first predicted output according to the first pre-training task;
generating, by the neural network model, a second predicted output in response to the bimodal input sequence according to a second pre-training task;
computing a second training objective based on the second predicted output according to the second pre-training task; and
alternately or jointly updating the neural network model based on the first training objective and the second training objective.

2. The method of claim 1, wherein the first predicted output is generated by: randomly masking a plurality of spans in the bimodal input sequence; and generating, by the decoder, a predicted masked sequence conditioned on the masked bimodal input sequence and a set of previously predicted masked sequences up to a current time instance.

3. The method of claim 2, wherein the first training objective is computed based on a conditional probability distribution of the masked bimodal input sequence and the set of previously predicted masked sequences up to the current time instance.

4. The method of claim 1 wherein the first training objective is computed based on a conditional probability of each token in the target sequence conditioned on the masked bimodal input sequence and tokens previously generated for the target sequence up to a respective token.

5. The method of claim 1, wherein the first predicted output is generated by: converting the PL segment into an Abstract Syntax Tree (AST); constructing, based on the AST, a sequence of binary labels, each binary label representing whether a respective code token in the PL segment is an identifier; and mapping final hidden states corresponding to the PL segment in the encoder into a sequence of probabilities.

6. The method of claim 5, wherein the first training objective is computed based on a binary cross-entropy loss between the sequence of probabilities and the sequence of binary labels.

7. The method of claim 1, wherein the second pre-training task is different from the first pre-training task.

8. The method of claim 1, further comprising: receiving one or more training datasets for refining the neural network model on multiple tasks at a time; prepending an input training sequence with a task control code indicating a type of a task corresponding to a specific training dataset; and generating, by the neural network model, a predicted output in response to the input training sequence according to the task control code.

9. The method of claim 8, wherein the input training sequence is sampled from the one or more training datasets according to a multinomial distribution computed based on respective sizes of the one or more training datasets.

10. A system for programming language (PL) generation and understanding using a neural network model, the system comprising:
   a memory storing the neural network model comprising an encoder and a decoder, and a plurality of processor-executable instructions; and
   a processor executing the plurality of processor-executable instructions to perform operations comprising:
      generating, by the neural network model, a first predicted output in response to a bimodal input sequence comprising a PL segment and a natural language (NL) segment according to a first pre-training task, wherein the first predicted output is generated by:
         masking a plurality of identifiers in the PL segment of the bimodal input sequence to generate a masked bimodal input sequence, wherein a designated mask token is used for a specific identifier of the plurality of identifiers,
         encoding, by an encoder of the neural network model, the masked bimodal input sequence into a first representation, and
         generating, by a decoder of the neural network model, a target sequence comprising the masked plurality of identifiers and corresponding designated mask tokens, from the first representation to generate the first predicted output,
      wherein the PL segment and the NL segment belong to an unlabeled code sample;
      computing a first training objective based on the first predicted output according to the first pre-training task;
      generating, by the neural network model, a second predicted output in response to the bimodal input sequence according to a second pre-training task;
      computing a second training objective based on the second predicted output according to the second pre-training task; and
      alternately or jointly updating the neural network model based on the first training objective and the second training objective.

11. The system of claim 10, wherein the first predicted output is generated by: randomly masking a plurality of spans in the bimodal input sequence; and generating, by the decoder, a predicted masked sequence conditioned on the masked bimodal input sequence and a set of previously predicted masked sequences up to a current time instance.

12. The system of claim 11, wherein the first training objective is computed based on a conditional probability distribution of the masked bimodal input sequence and the set of previously predicted masked sequences up to the current time instance.

13. The system of claim 10, wherein the first training objective is computed based on a conditional probability of each token in the target sequence conditioned on the masked bimodal input sequence and tokens previously generated for the target sequence up to a respective token.

14. The system of claim 10, wherein the first predicted output is generated by: converting the PL segment into an Abstract Syntax Tree (AST); constructing, based on the AST, a sequence of binary labels, each binary label representing whether a respective code token in the PL segment is an identifier; and mapping final hidden states corresponding to the PL segment in the encoder into a sequence of probabilities.

15. The system of claim 14, wherein the first training objective is computed based on a binary cross-entropy loss between the sequence of probabilities and the sequence of binary labels.

16. The system of claim 10, wherein the second pre-training task is different from the first pre-training task.

17. The system of claim 10, wherein the operations further comprise: receiving one or more training datasets for refining the neural network model on multiple tasks at a time; prepending an input training sequence with a task control code indicating a type of a task corresponding to a specific training dataset; and generating, by the neural network model, a predicted output in response to the input training sequence according to the task control code.

18. A non-transitory machine-readable medium storing a plurality of processor-executable instructions for programming language (PL) generation and understanding using an encoder-decoder model, the plurality of processor-executable instructions being executed by one or more hardware processors to perform operations comprising:
   generating, by the neural network model, a first predicted output in response to a bimodal input sequence comprising a PL segment and a natural language (NL) segment according to a first pre-training task, wherein the first predicted output is generated by:
      masking a plurality of identifiers in the PL segment of the bimodal input sequence to generate a masked bimodal input sequence, wherein a designated mask token is used for a specific identifier of the plurality of identifiers,
      encoding, by an encoder of the neural network model, the masked bimodal input sequence into a first representation, and
      generating, by a decoder of the neural network model, a target sequence comprising the masked plurality of identifiers and corresponding designated mask tokens, from the first representation to generate the first predicted output, wherein the PL segment and the NL segment belong to an unlabeled code sample;

computing a first training objective based on the first predicted output according to the first pre-training task;

generating, by the neural network model, a second predicted output in response to the bimodal input sequence according to a second pre-training task;

computing a second training objective based on the second predicted output according to the second pre-training task; and alternately or jointly updating the neural network model based on the first training objective and the second training objective.

* * * * *